M. J. & P. BONARD.
SAFETY APPARATUS FOR SUBMARINES.
APPLICATION FILED APR. 21, 1914.
1,156,970.
Patented Oct. 19, 1915.
5 SHEETS—SHEET 1.
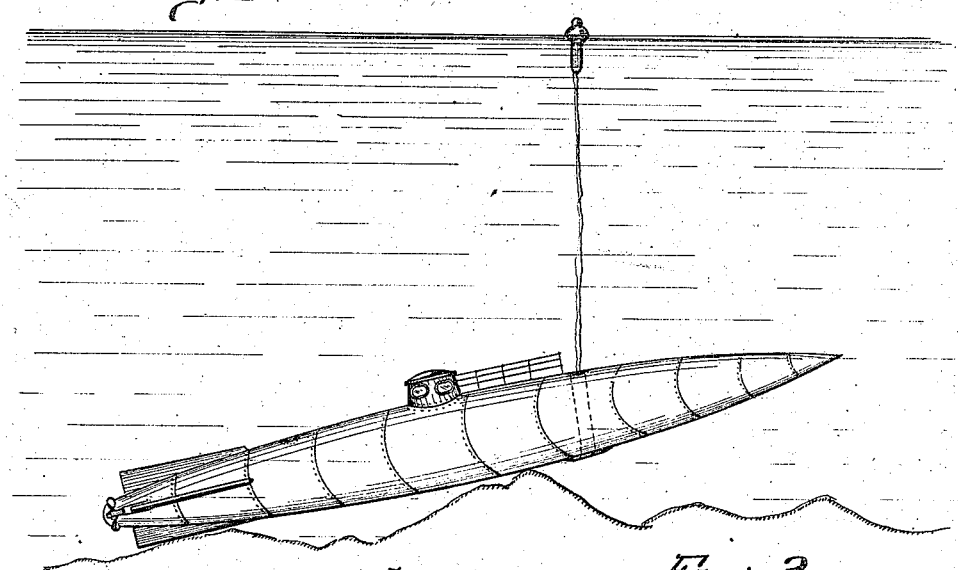
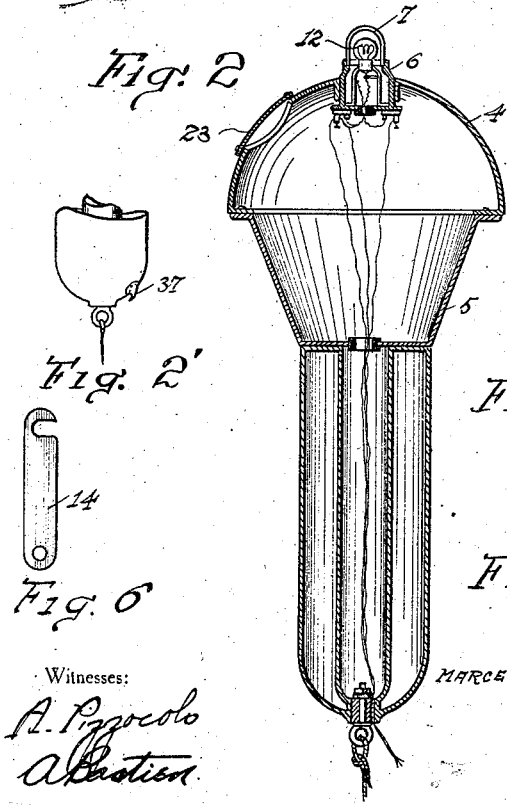
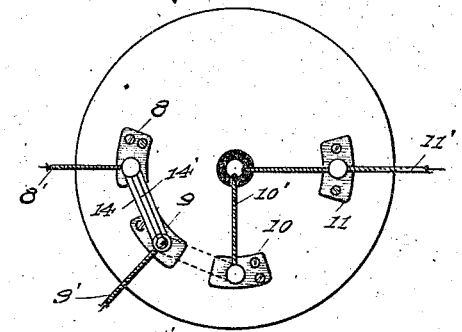
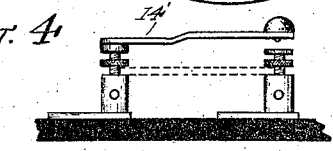
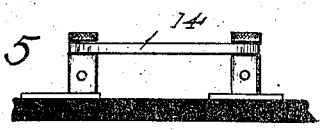
MARCEL JOSEPH LEON PAUL BONARD  Inventor

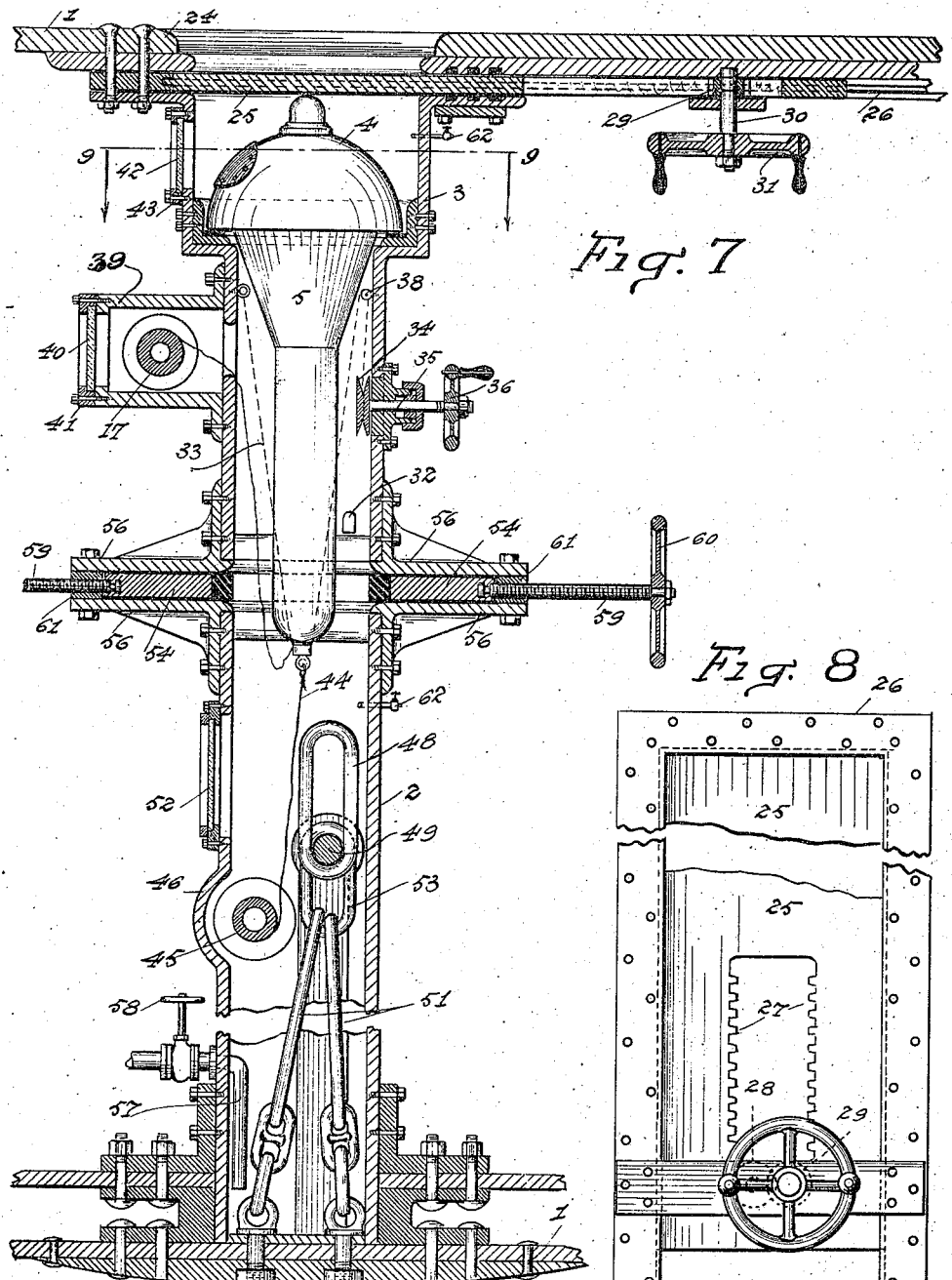

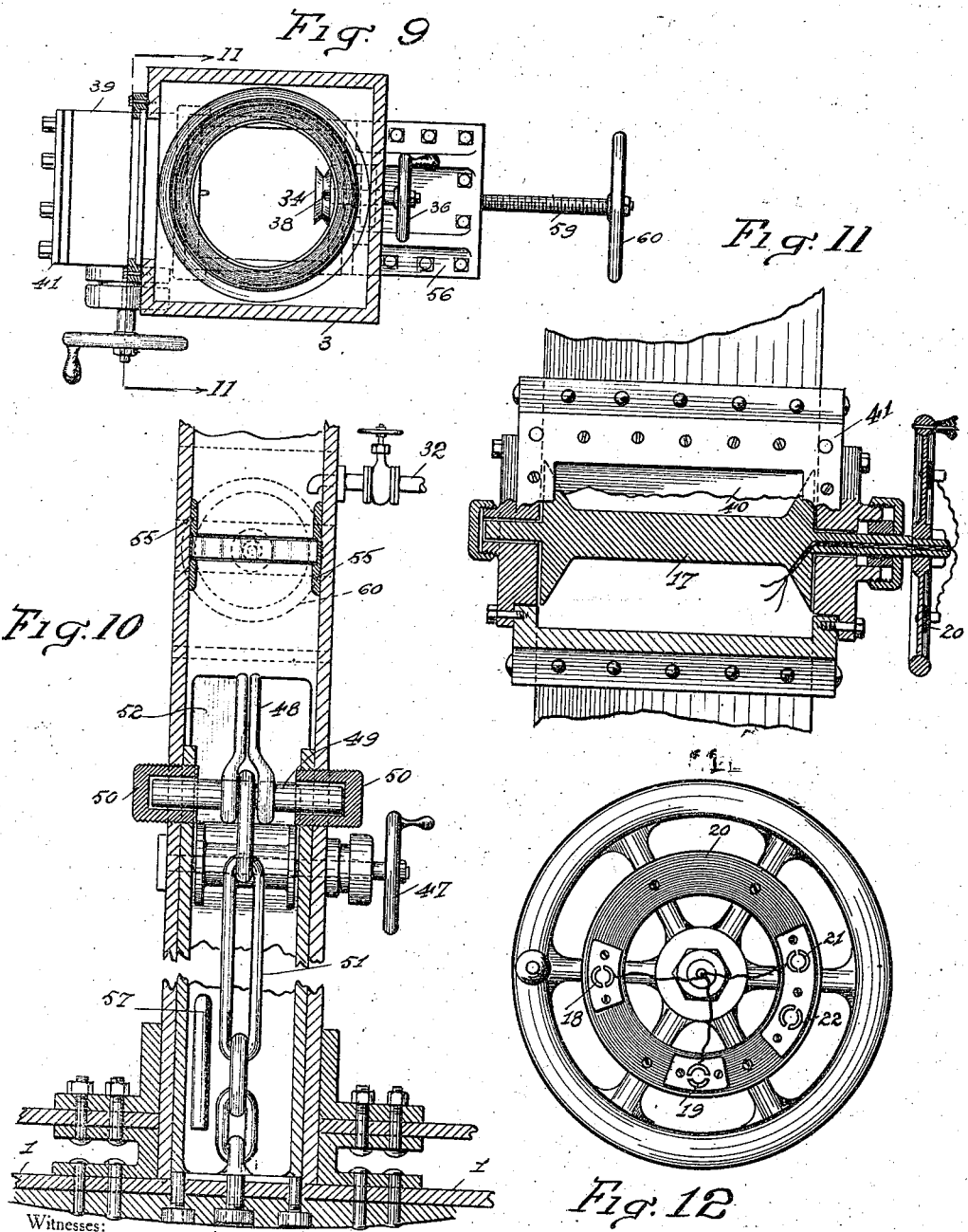

M. J. L. P. BONARD.
SAFETY APPARATUS FOR SUBMARINES.
APPLICATION FILED APR. 21, 1914.
1,156,970.
Patented Oct. 19, 1915.
5 SHEETS—SHEET 4.
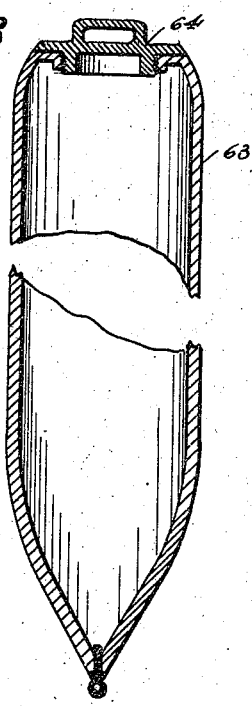
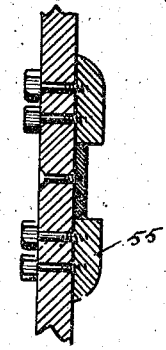
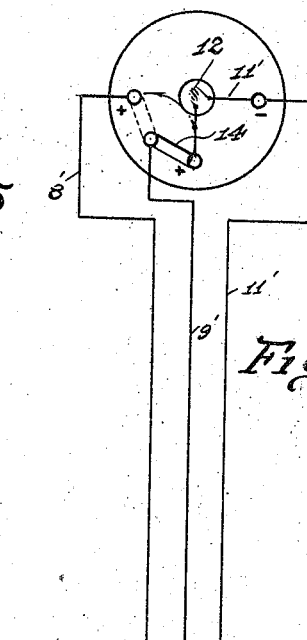
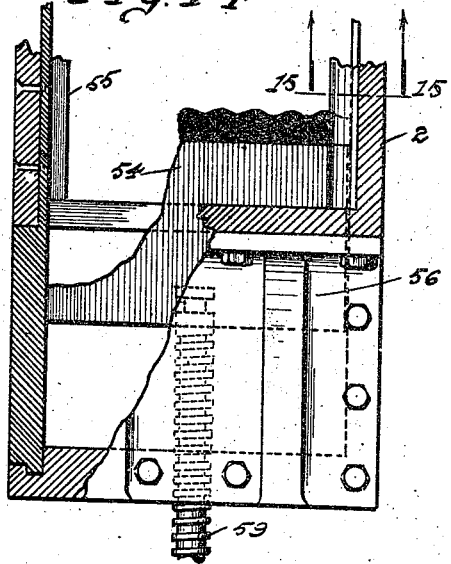
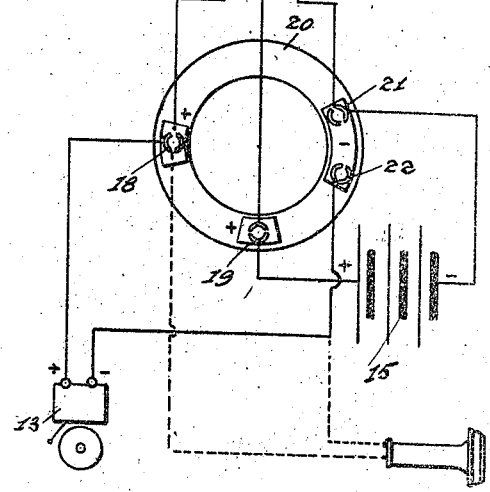
Witnesses:
MARCEL JOSEPH LEON PAUL BONARD Inventor
By
Attorneys

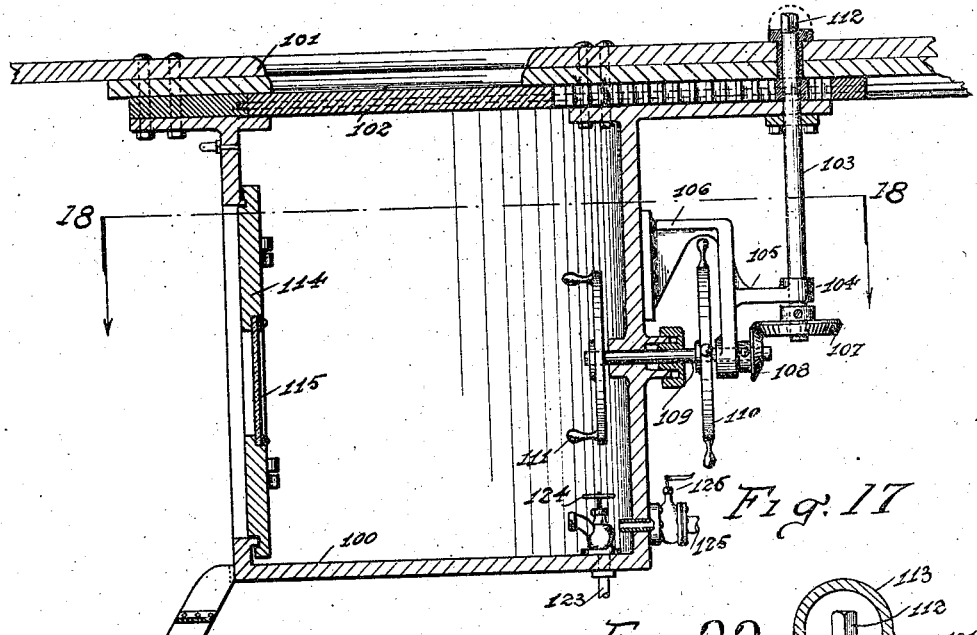
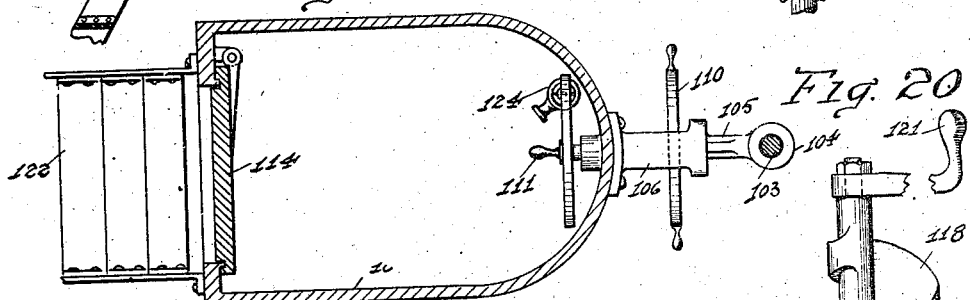
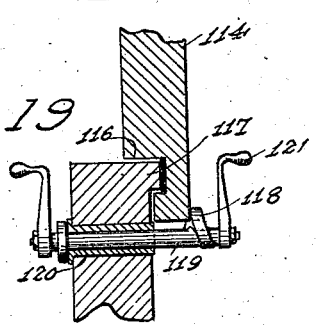
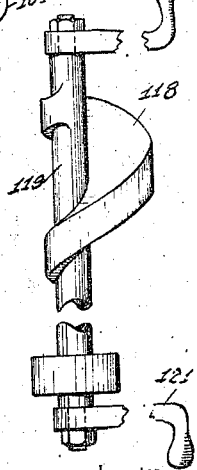

UNITED STATES PATENT OFFICE.

MARCEL JOSEPH LEON PAUL BONARD, OF MONTREAL, QUEBEC, CANADA.

SAFETY APPARATUS FOR SUBMARINES.

1,156,970.   Specification of Letters Patent.   Patented Oct. 19, 1915.

Application filed April 21, 1914. Serial No. 833,455.

*To all whom it may concern:*

Be it known that I, MARCEL JOSEPH LEON PAUL BONARD, a citizen of the French Republic, residing at No. 1654 Esplanade avenue, Montreal, Province of Quebec, Canada, have invented certain new and useful Improvements in Safety Apparatus for Submarines; and I do hereby declare that the following is a full, clear, and exact description of the invention, such as will enable others skilled in the art to which is appertains to make and use the same.

The invention to be hereinafter described relates to safety apparatus for submarines.

In order to more clearly disclose the construction, operation, and use of the invention, reference should be had to the accompanying drawings forming part of the present application.

Throughout the several figures of the drawings like reference characters designate the same parts.

In the drawings: Figure 1 is a perspective view, showing the invention in use; Fig. 2 is a central, vertical, longitudinal, cross section, through the signal buoy; Fig. 2' is a fragmentary view showing hook 37; Fig. 3 is an enlarged plan view showing the connections for the light and telephone; Fig. 4 is an enlarged side elevation of the bell contact, in use; Fig. 5 is a like view of a switch in the bell and telephone circuits, in use; Fig. 6 is a plan view of the same switch; Fig. 7 is a central, vertical, longitudinal, cross section through the buoy well and coöperating parts; Fig. 8 is a plan view of one of the sliding doors 25; Fig. 9 is a cross section on line 9—9 of Fig. 7; Fig. 10 is a cross section similar to Fig. 7, but at right angles thereto; Fig. 11 is a cross section on line 11—11 of Fig. 9; Fig. 12 is a plan view of the hand wheel of the drum for the electric wires; Fig. 13 is a central, longitudinal, cross section through a supply buoy, enlarged; Fig. 14 is a fragmentary cross section showing the guides for the cable clamps; Fig. 15 is an enlarged cross section on line 15—15 of Fig. 14; Fig. 16 is a diagrammatic view of the electric circuits; Fig. 17 is a central, vertical, cross section through an escape chamber and its related parts; Fig. 18 is a horizontal cross section on line 18—18 of Fig. 17; Fig. 19 is a plan view of the door fastening device, applied; Fig. 20 is an enlarged plan view of the same device, separate; Fig. 21 is an end view of the same; and Fig. 22 is an enlarged cross section through the shaft end protector, or cap.

The main object of the invention is to provide a simple, efficient, economical, durable, and compact apparatus by which signals may be transmitted from the interior of a submerged submarine to search or rescue parties, supplies sent to them, and hoisting tackle quickly and reliably connected for raising; together with apparatus for the individual escape of the crew and passengers independently of rescuing parties.

Referring to the drawings in detail, 1 indicates the hull of a submarine. Between the top and bottom walls and at a suitable point in its length, is constructed a well extending completely through the hull, vertically, from top to bottom. The upper part of this well is considerably enlarged to form a back or receiving chamber 3 the lower wall of which acts as a shoulder or rest to receive the under face or wall of the head 4 of a signal buoy 5 which is thus suspended within the well, as clearly shown in Fig. 7. Extending through the top of the head is a small casing 6 with a transparent top or globe 7. The base of this casing carries four metal plates 8, 9, 10, and 11 to which wires 8', 9', 10', and 11' are connected. The wires 11' and 10', respectively, lead to and from a light bulb 12 mounted within the casing or globe 7. The wires 8' and 9' lead to and from a telephone bell 13. A switch 14, in the form of a small plate pivoted on the binding post of wire 9' and provided with a hook end to engage the binding post of wire 8' or 10', selectively, is used to divert the current or circuit from the light through the bell, so that rescuers may notify those in the submarine, as soon as the buoy has been found, as indicated by dotted lines in Fig. 16. Thus, the single battery 15 serves for both circuits. The three wires 8', 9', and 11' are led down through the center of the buoy and out through a suitable plug or coupling in its base. They are then wound upon a drum 17, passed through an axial bore of an extended end of the drum and connected to spring sockets 18, 19, and 21, respectively, carried by plates secured to a hand wheel 20, by which the drum is operated to wind in or pay out the wire as required. On the same plate as that carrying spring socket 21 is a second spring socket 22. Now, after the buoy has been floated out and the wires been paid out, the hand wheel 20 will remain stationary, or nearly so. Then the plug terminals from the battery will be inserted in sockets 19 and 21 and the plug terminals from the bell will be inserted in the sockets 18 and 22. With the switch plate 14 in the full line position of Fig. 16 the current will pass through wires 11', lamp 12, wire 10', switch 14, wire 9', and the battery, lighting the lamp. When the rescuing party arrives, the hand hole cover 23 will be taken off and the plate 14 swung to the dotted line position of Fig. 16, thereby shifting the circuit through the battery, sockets 21 and 22, bell 13, wire 8', switch 14, and back through wire 9' to the battery, sounding the bell. Instead of the plate 14, a spring plate 14' with push button contact may be used to give an intermittent ring. When the people in the submarine have thus been notified of the arrival of rescuers, a telephone receiver may be substituted for the bell by simply pulling out the bell terminals and replacing them with the receiver terminals. The rescuers, of course, can couple a receiver to the binding posts of the wires 8' and 9', and, in this way, keep in full touch with the people in the submarine. This is of great importance, since it enables the rescuers to determine exactly the condition of the people in the submarine and what aid they most urgently need. By having spring contacts on the wheel 20 to receive the plug terminals of the bell, battery, and telephone receiver, all twisting or winding of the wires of these parts is completely avoided, because the plugs will not be inserted until the unwinding action of the drum has been completed and the wheel 20 has become stationary.

The hull of the ship is cut out directly above the upper end of the well to form an opening 24 through which the buoy may escape. This is normally closed by gate 25 mounted to slide horizontally in suitable water tight guides 26 made fast to the hull of the submarine. The gate is provided with two parallel longitudinal rack sections 27 adapted to be engaged by pinions 28 and 29, the pinion 29 being fixed to the shaft 30 of a hand wheel 31 and the pinion 28 being driven from pinion 29, in well known manner. When the gate 25 is closed, as in Fig. 7, the buoy, of course, can not escape; but as soon as the gate is opened, the buoy is free to rise. At any considerable depth, however, the water pressure is so great as to jam the head 4 tightly to its seat on the shoulder of well 2, thus preventing the buoy from rising. To avoid this, a pipe or tube 32, provided with suitable turn cock, is connected to the well at a short distance above the lower end of the buoy. Prior to opening the gate 4, the well 2 will be filled with water through this pipe. As the water rises above the lower end of the buoy it will tend to force it up. Thus, the instant that the gate is opened, the buoy will rise a little so that there will be a space between the under surface of its head 4 and the seat on which it normally rests. The incoming water will rush around the head and into the well and the buoy will shoot upward to the surface, thus completely avoiding all jamming. Should the boat be canted to one side or the other, the buoy might bind against the walls of the well and not float out, as intended. To avoid this a lifting device is provided. This comprises a rope or cable 33 secured at one end to an eye bolt or the like threaded into the upper part of one wall of the well, and having its opposite end made fast to a winding spool or the like 34 fixed on the end of a short shaft 35 journaled in the opposite wall of the well and provided with a suitable hand wheel, crank handle, or the like 36. This rope, cable, or the like, is passed down from the eye bolt previously mentioned to the lower end of the buoy, beneath a hook or the like 37, thereon, up over a pulley 38 opposite the eye bolt and down to the spool 34. By winding in the cable 33, the loop beneath the hook 37 will be shortened, thus forcing the buoy out of the well and through opening 24 so that it will be free to rise.

The drum for the signal wires should be mounted close to the well, of course, so that the wires may be paid out from it directly into the interior of the well through a suitable opening. To this end, a suitable box 39 is made fast to the upper part of the well and around an opening in the upper wall. One end or wall of this box is formed of a transparent plate 40 held in place between a rectangular clamping frame 41 and the edges of the remaining walls of the box. This permits ready inspection of the inside of the box and the drum, in case of necessity, without opening up the box. The same is true of the receiving chamber 3, the transparent panel 42 being similarly secured in place by a clamping frame 43 to permit inspection with or without access, as may be desired.

To the lower end of the buoy is secured a cable 44 of considerable length, which is wound upon and carried by a drum 45 journaled in an enlargement 46 in the lower part of the well. The axis of this drum is extended through the wall of the well and provided with a hand wheel, crank handle, or the like 47. This acts as an anchor rope and also as a means of returning the buoy to its well, if desired. It may also be used as a guide line for swinging a lifting cable or the like into the well from a rescue party, as will be readily understood. For attaching such a cable securely to the hull of the submarine, a stout rod 49 is provided. This rod is seated in brass thimbles or sockets 50 screw threaded or otherwise removably mounted in the walls of the well to act as bearings for the rod. This rod is passed through links 48 and 53; the link 53 connecting two short chains 51, solidly bolted or otherwise secured to the bottom of the hull, as clearly shown in Fig. 7. To determine when the lifting cable has reached the desired point for connection to link 48, a window 52 is provided in the lower part of the well, just above the thimbles 50. This window, being removable, also provides means for examination, removal, repairing, &c., of the drum 45, cable 44, connection of cable 44 to the buoy, and readier insertion of the rod 49 through the links 48 and 53.

When the lifting cable has been passed into the well 2 far enough to be connected to link 48, it should be securely held there until the connection is made. For this purpose, two heavy clamping jaws 54 are provided, slidably mounted in guides 55 in the inside walls of the well and between parallel flanges 56 of the outer walls of the well. The operative faces or edges of these jaws are made of rubber so that, when forced to clamping position, about the lifting cable, the cable will be temporarily embedded in them and their contacting edges will form a water tight joint. The water may then be drawn out of the lower part of the well—below these closed jaws—by means of pipe 57 provided with valve 58. For this purpose, the pipe 57 may be connected to any suitable pumping apparatus, if desired. The jaws 54 are operated by screw threaded rods 59 provided with hand wheels 60. These rods are threaded through blocks 61 securely held between the outer edges of the flanges 56 and have free turning connection with the jaws, all as clearly shown in Fig. 7. Air cocks 62 are provided at several points in the well 2 to permit escape of air during filling of the same or to admit air in reversing operation.

For sending oxygen tubes, or other supplies to the imprisoned people in the submarine, a cylindrical shell 63 with removable screw threaded closure 64 is provided. This is adapted to be drawn into the well 2 by means of a cable attached to it and wound in on the drum 45. For the individual escape of the imprisoned people, an escape chamber 100 is provided. This chamber is suspended from the top of the hull and has its open upper side or top alined with a corresponding opening 101 made in the hull of the submarine, a sliding gate 102 similar to and operated in the same way as gate 25, being provided. The shaft 103 for operating it, however, is extended both inwardly and outwardly. Its inward extension is passed through a collar 104 carried by an arm 105 of a bracket 106 mounted on the adjacent wall of the escape chamber 100. Secured to the inner end of the shaft 103 is a beveled pinion 107 which meshes with and drives a corresponding pinion 108 fixed to a shaft 109 journaled in and extending through the wall of the escape chamber. This shaft has fixed to it two hand wheels 110 and 111, one within the chamber 100 and one within the hull, outside of the chamber. That part of the rod 103 extended outwardly beyond the hull is secured, as at 112, to receive the socket of a crank handle, wrench, or the like for turning it. It may be protected by a cap or nut 113 seated over and inclosing it, the nut or cap being secured in any usual and well known manner. By this arrangement, the gate 102 may be operated from within the chamber 100, from within the hull and outside of the chamber, or by a rescuing party from outside of the hull. A door 114, with sight glass panel 115, gives access to the chamber. It is provided with a rubber packed peripheral groove 116 adapted to receive and coöperate with a corresponding rib 117 formed on the wall surrounding the door opening. This door is hingedly mounted in any usual and well known manner and is adapted to be forced into water tight closing position by means of a screw cam 118 formed on a rod 119 which is journaled in a suitable bushing 120 seated in the wall of the chamber 100 near the edge of the door opening. The screw cam is adapted to overlap and engage the door edge as it reaches closing position and forces it to a water tight closure. Both ends of rod 119 are provided with crank handles 121 by which it may be operated either from within the chamber, or from within the hull, outside of the chamber. The usual ladder 122 is provided for reaching the chamber from the interior of the hull. A pipe 123 is provided for emptying the chamber from within, the controlling valve 124 being placed inside of the chamber. Or, the chamber may be emptied from the interior of the hull, but outside of the chamber, by a pipe 125 having a valve 126 inside the hull but outside of the chamber.

In use, for individual escape of those imprisoned, the rod 119 will be rotated to release the door 114, the person will then open the door and enter chamber 100, close and fasten the door, open gate 102 by hand wheel 111, and escape. The next person will first close gate 102 by hand wheel 110, drain the chamber by pipe 125 and valve 126, and then repeat what the first has done. In use by rescuers, the cap 113 will be removed, the gate 102 opened by a crank or the like fitted on to the squared end 112, the rescuer will then enter the chamber 100, close the gate by hand wheel 111, drain the chamber by pipe 123 and valve 124, and then open the door 114.

It is obvious that the same apparatus and ideas may be applied to one or more of the air tight compartments of the ordinary ship, vessel, or boat.

It is thought that the construction, operation, and use of the invention will be clear from the preceding detailed description.

Changes may be made in the construction, arrangement, and disposition of the several parts of the invention without in any way departing from the field and scope of the same, and it is meant to include all such within this application, wherein only a preferred form has been disclosed.

Having thus fully described my invention, what I claim as new and desire to secure by Letters Patent is:

1. An apparatus of the character described comprising, a submarine hull provided with an opening, a well erected within the same and inclosing said opening, short chains within said well and solidly connected to said hull, clamping jaws slidably mounted within said well and adapted to simultaneously grip a lifting cable and close off the lower part of said well, and means for connecting said short chains to a lifting cable.

2. An apparatus of the character described comprising, a submarine hull provided with an opening, a well erected within the same and inclosing said opening, short chains within said well and solidly connected to said hull, clamping jaws slidably mounted within said well and adapted to simultaneously grip a lifting cable and close off the lower part of said well, means for removing the water from the lower part of the well when the said clamping jaws have been closed, and means for permitting entrance to the lower part of the said well.

3. An apparatus of the character described comprising a submarine hull provided with an opening, a well erected within the same and inclosing said opening and adapted to receive a signaling buoy, means for normally closing the said opening, operating means therefor, means within the well for expelling the buoy therefrom and operable from within the said hull, short chains located within the lower part of the said well and securely fastened to the said hull, clamping jaws slidably mounted within the well and adapted to be forced together upon a lifting cable lowered into the well so as to simultaneously grip the same and form a water tight closure above the said chains, operating means therefor, means for removing the water from the lower part of the well when the said clamping jaws have thus been closed, and means for permitting entrance to the lower portion of the said well.

4. In combination, a hull, a rescue chamber suspended therein and provided at its top with an opening through the said hull, means for normally closing the said opening, operating means therefor, means for permitting entrance to the said chamber, a well extending to the top and bottom of the said hull and communicating with an opening through the hull at its upper end, means for normally closing the said opening, operating means therefor, short chains in the lower part of the said well secured to the said hull, means for gripping a cable lowered into the said well and for forming a water tight closure across the well above the said chains, operating means therefor, means for removing water from the lower part of the well when the gripping means are closed, and means for permitting entrance into the lower part of the said well.

5. In combination; a submarine hull; a rescue chamber suspended therein and provided, at its top, with an opening extending through the said hull; a slidably mounted gate adapted to normally close the said opening; operating means therefor, such means being adapted to be operated from within the said chamber, from within the said hull, or from without the hull; a water tight door adapted to permit entrance to the said chamber; means for securing the said door closed and operable either from within the chamber or from within the hull; means for emptying the said chamber of water controlled from within the said chamber; means for emptying the chamber of water controlled from within the said hull; a well extending from top to bottom of the said hull and provided in its upper end with an annular shoulder adapted to form a seat for the head of a headed signaling buoy and to hold the same suspended within the said well, the said well communicating at its upper end with an opening through the said hull; means located within the said well for lifting a buoy seated therein; operating means therefor operable from within the said hull; a sliding gate adapted to normally close the said opening at the upper end of the well; means for operating the said gate from within the said hull; short chains located in the lower part of the said well and securely fastened to the hull; clamping jaws slidably mounted at each side of the well, above the said chains, and adapted to simultaneously grip a cable lowered into the said well and to form a water tight closure across the well; means for operating the said jaws from within the hull; means for removing water from the lower part of the well when the said jaws are in operative position; and means for permitting access to the lower part of the said well.

MARCEL JOSEPH LEON PAUL BONARD.

Witnesses:
   A. BASTIEN,
   A. PIZZOCOLO.